US011262575B2

(12) United States Patent
Lee et al.

(10) Patent No.: US 11,262,575 B2
(45) Date of Patent: Mar. 1, 2022

(54) MEMS PACKAGE WITH DOUBLE-SIDED MIRROR

(71) Applicant: Beijing Voyager Technology Co., Ltd., Beijing (CN)

(72) Inventors: Sae Won Lee, Mountain View, CA (US); Youmin Wang, Mountain View, CA (US); Qin Zhou, Mountain View, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 216 days.

(21) Appl. No.: 16/290,670

(22) Filed: Mar. 1, 2019

(65) Prior Publication Data

US 2020/0278532 A1 Sep. 3, 2020

(51) Int. Cl.
  *G02B 26/08* (2006.01)
  *G01S 7/481* (2006.01)
  *G02B 26/10* (2006.01)

(52) U.S. Cl.
  CPC ........ *G02B 26/0833* (2013.01); *G01S 7/4817* (2013.01); *G02B 26/10* (2013.01)

(58) Field of Classification Search
  None
  See application file for complete search history.

(56) References Cited

U.S. PATENT DOCUMENTS

| 6,467,345 | B1 * | 10/2002 | Neukermans | B82Y 15/00 73/504.02 |
| 7,362,484 | B2 * | 4/2008 | Mun | G02B 26/105 359/197.1 |
| 7,894,114 | B2 * | 2/2011 | Urakawa | G02B 26/101 359/205.1 |
| 10,422,881 | B1 * | 9/2019 | Wang | G02B 26/085 |

(Continued)

FOREIGN PATENT DOCUMENTS

| CN | 102298207 | 12/2011 |
| CN | 102944879 | 2/2013 |

(Continued)

OTHER PUBLICATIONS

International Search Report and Written Opinion for PCT/IB2020/051736 dated Jun. 4, 2020, 9 pages.

(Continued)

*Primary Examiner* — Jennifer D. Carruth
(74) *Attorney, Agent, or Firm* — Kilpatrick Townsend & Stockton LLP

(57) ABSTRACT

Methods and systems for using a dual sided MEMS mirror for determining a direction of steered light are disclosed. In one example a MEMS package includes a substrate defining an aperture and a dual sided MEMS mirror is positioned over the aperture. A first surface of the MEMS mirror is used to steer a LiDAR beam that is used to perform LiDAR imaging of an area of interest. As the mirror is moved, a second surface of the mirror reflects a sensing beam onto a detector array. Data from the detector array is used to (Continued)

determine an orientation of the mirror which can then be used to determine a direction of the steered LiDAR beam. The MEMS package can form an enclosure for the MEMS mirror that includes a first and a second transparent window attached to two opposing surfaces of the substrate.

14 Claims, 6 Drawing Sheets

(56) References Cited

U.S. PATENT DOCUMENTS

| | | | | |
|---|---|---|---|---|
| 2002/0146200 | A1* | 10/2002 | Kudrle | G02B 6/357 |
| | | | | 385/18 |
| 2007/0146851 | A1* | 6/2007 | Nakajima | G02B 26/105 |
| | | | | 359/199.1 |
| 2010/0046054 | A1* | 2/2010 | Jeong | G02B 26/085 |
| | | | | 359/200.7 |
| 2010/0172612 | A1* | 7/2010 | Moidu | G02B 26/0841 |
| | | | | 385/18 |
| 2017/0102538 | A1 | 4/2017 | Gamet et al. | |
| 2017/0184707 | A1 | 6/2017 | Sugiura et al. | |
| 2018/0246315 | A1 | 8/2018 | Miner et al. | |
| 2019/0041501 | A1* | 2/2019 | Noguchi | G02B 26/129 |
| 2019/0293923 | A1* | 9/2019 | Ghahremani | G01S 7/4817 |
| 2020/0225084 | A1 | 7/2020 | de Wit | |
| 2020/0278428 | A1* | 9/2020 | Wang | G02B 26/101 |
| 2020/0278532 | A1* | 9/2020 | Lee | G01S 7/4817 |
| 2020/0333547 | A1* | 10/2020 | Mollard | G02B 5/0226 |

FOREIGN PATENT DOCUMENTS

| | | |
|---|---|---|
| CN | 104423036 | 3/2015 |
| CN | 207336754 | 5/2018 |
| CN | 108427123 | 8/2018 |
| DE | 102016221245 | 5/2018 |
| EP | 3109685 | 12/2016 |
| WO | 2018175757 | 9/2018 |
| WO | 2019037809 | 2/2019 |

OTHER PUBLICATIONS

International Search Report and Written Opinion for PCT/IB2020/051739 dated May 27, 2020, 9 pages.
Non-Final Office Action for U.S. Appl. No. 16/728,874 dated Mar. 30, 2021, 13 pages.
Final Office Action for U.S. Appl. No. 16/728,874, dated Aug. 25, 2021, 14 pages.
International Preliminary Report on Patentability for PCT/IB2020/051736, dated Sep. 16, 2021, 5 pages.
International Preliminary Report on Patentability for PCT/IB2020/051739, dated Sep. 16, 2021, 5 pages.

* cited by examiner

MEMS PACKAGE WITH DOUBLE-SIDED MIRROR

BACKGROUND

Modern vehicles are often fitted with a suite of environment detection sensors that are designed to detect objects and landscape features around the vehicle in real-time that can be used as a foundation for many present and emerging technologies such as lane change assistance, collision avoidance, and autonomous driving capabilities. Some commonly used sensing systems include optical sensors (e.g., infra-red, cameras, etc.), radio detection and ranging (RADAR) for detecting presence, direction, distance, and speeds of other vehicles or objects, magnetometers (e.g., passive sensing of large ferrous objects, such as trucks, cars, or rail cars), and light detection and ranging (LiDAR).

LiDAR typically uses a pulsed light source and a light detection system to estimate distances to environmental features (e.g., vehicles, structures, etc.). In some systems, the light source can be steered in a repeating scanning pattern across a region of interest to form a collection of points that are dynamically and continuously updated in real-time, forming a "point cloud." The point cloud data can be used to estimate, for example, a distance, dimension, and location of an object relative to the LiDAR system, often with very high fidelity (e.g., within 5 cm).

In some applications the light source is steered by reflecting the light source off of a manipulable mirror that is formed as a part of a micro-electromechanical system (MEMS) device. Thus, by controlling an orientation of the mirror a single light source can be steered in a scanning pattern to generate the "point cloud". To increase the speed and accuracy of LiDAR systems new LiDAR systems will require improvements in determining and controlling the mirror's position.

BRIEF SUMMARY

In some embodiments a micro-electromechanical system (MEMS) package comprises a manipulable mirror having a first reflective surface positioned opposite and spaced apart from a second reflective surface. A first transparent window is positioned adjacent to and aligned with the first reflective surface, and a second transparent window is positioned adjacent to and aligned with the second reflective surface. In various embodiments the mirror is a portion of a MEMS device. In some embodiments the MEMS package further comprises a substrate extending between and attached to the first and second transparent windows wherein the substrate is further electrically and mechanically coupled to the MEMS device.

In some embodiments the substrate includes an aperture aligned with and positioned over the second reflective surface. In various embodiments a hermetic seal is formed between the substrate and the first and second transparent windows. In some embodiments the first transparent window is positioned to allow a LiDAR light beam to pass through and be reflected off the first reflective surface. In various embodiments the second transparent window is positioned to allow a sensing beam to pass through and be reflected off the second reflective surface. In some embodiments the first transparent window is not parallel with the second transparent window.

In some embodiments a micro-electromechanical system (MEMS) package comprises a substrate defining an aperture, a MEMS device attached to the substrate and including a plate positioned over the aperture, wherein the plate includes first and second opposing mirrored surfaces. A first transparent window is attached to a first side of the substrate, and a second transparent window is attached to a second side of the substrate.

In some embodiments the plate moves in response to one or more electrical signals applied to the MEMS device. In various embodiments the first and second opposing mirrored surfaces move simultaneously. In some embodiments the first transparent window is configured to allow a LiDAR light beam to pass through and be reflected off the first mirrored surface. In various embodiments the second transparent window is configured to allow a sensing beam to pass through and be reflected off the second mirrored surface.

In some embodiments a method of using a micro-electromechanical system (MEMS) package comprises receiving a first light beam through a first window of the MEMS package and steering a reflection of the first light beam through the first window by reflecting the first light beam off a first surface of a mirror. A second light beam is received through a second window of the MEMS package and a reflection of the second light beam is steered through the second window by reflecting the second light beam off a second surface of the mirror, wherein the first surface and the second surface of the mirror are opposite sides of the mirror.

In some embodiments an orientation of the mirror is determined by detecting the reflection of the second light beam. In various embodiments the orientation of the mirror is used to determine a direction of the reflection of the first light beam. In some embodiments a detector array is positioned outside of the MEMS package and is configured to detect the reflection of the second light beam.

In some embodiments the mirror pivots about a first axis and a second axis wherein the first axis is orthogonal to the second axis. In various embodiments the mirror pivots in response to an application of one or more electrical signals to a MEMS device that includes the mirror. In some embodiments the MEMS package includes a substrate defining an aperture and the second surface of the mirror is aligned with and positioned over the aperture.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

BRIEF DESCRIPTION OF THE DRAWINGS

The detailed description is set forth with reference to the accompanying figures.

DETAILED DESCRIPTION

Aspects of the present disclosure relate generally to object and environment detection systems, and more particularly to LiDAR systems, according to certain embodiments.

In the following description, various examples of microelectromechanical systems (MEMS) mirror devices that can be used for LiDAR-based systems are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Figure 1:
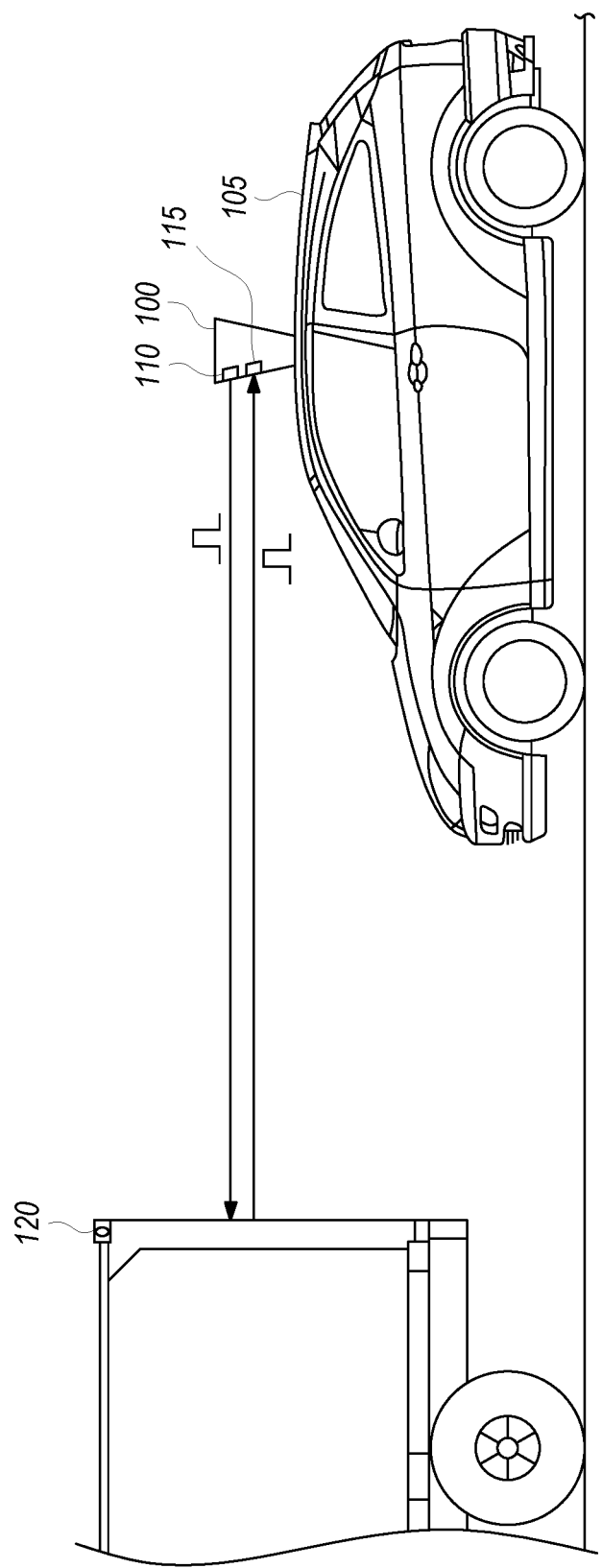
FIG. 1 illustrates an autonomous driving vehicle, according to certain embodiments of the invention.

The following high level summary is intended to provide a basic understanding of some of the novel innovations depicted in the figures and presented in the corresponding descriptions provided below. Aspects of the invention relate to an LiDAR-based system. As an illustrative example, FIG. 1 depicts a LiDAR-based system 100 mounted on a vehicle 105 (e.g., automobile, unmanned aerial vehicle, etc.). LiDAR system 100 may use a pulsed light LiDAR source 110 (e.g., focused light, lasers, etc.) and detection system 115 to detect external objects and environmental features (e.g., vehicle 120, structures, etc.), determine a vehicle's position, speed, and direction relative to the detected external objects, and in some cases may be used to determine a probability of collision, avoidance strategies, or otherwise facilitate certain remedial actions.

LiDAR source 110 may employ a light steering system, described in more detail below, that includes a mirror that steers a pulsed light source also called a LiDAR beam. In some embodiments the mirror is manipulable and sequentially steers the LiDAR beam in a scan and repeat pattern across a large area to detect obstacles around the vehicle and to determine distances between the obstacles and the vehicle. The mirror can be part of a MEMS device that enables the mirror to be rotated about one or more axes (e.g., tilted).

As the mirror is rotated to steer the LiDAR beam, knowledge of the mirror's position can be used to determine the direction the reflected LiDAR beam is pointing. In some embodiments the mirror may be dual sided (e.g., include two opposite and opposing reflective surfaces) such that one surface of the mirror steers the LiDAR beam and the other surface reflects a sensing beam onto a detector that senses a position of the mirror. More specifically, to detect the position of the mirror a sensing beam can be directed on to the second side of the mirror which steers the sensing beam on to a detector array in an identical but opposite manner as the LiDAR beam. Data from the detector can be used to determine the orientation of the mirror and the related direction of the reflected LiDAR beam.

In order to better appreciate the features and aspects of dual sided MEMS mirrors for LiDAR systems according to the present disclosure, further context for the disclosure is provided in the following section by discussing one particular implementation of a MEMS device having a dual sided mirror according to some embodiments of the present disclosure. These embodiments are for example only and other embodiments can be employed in other systems such as, but not limited to optical diagnostic equipment, optical manufacturing equipment (e.g., laser direct structuring) or any other system that steers light.

Figure 2:
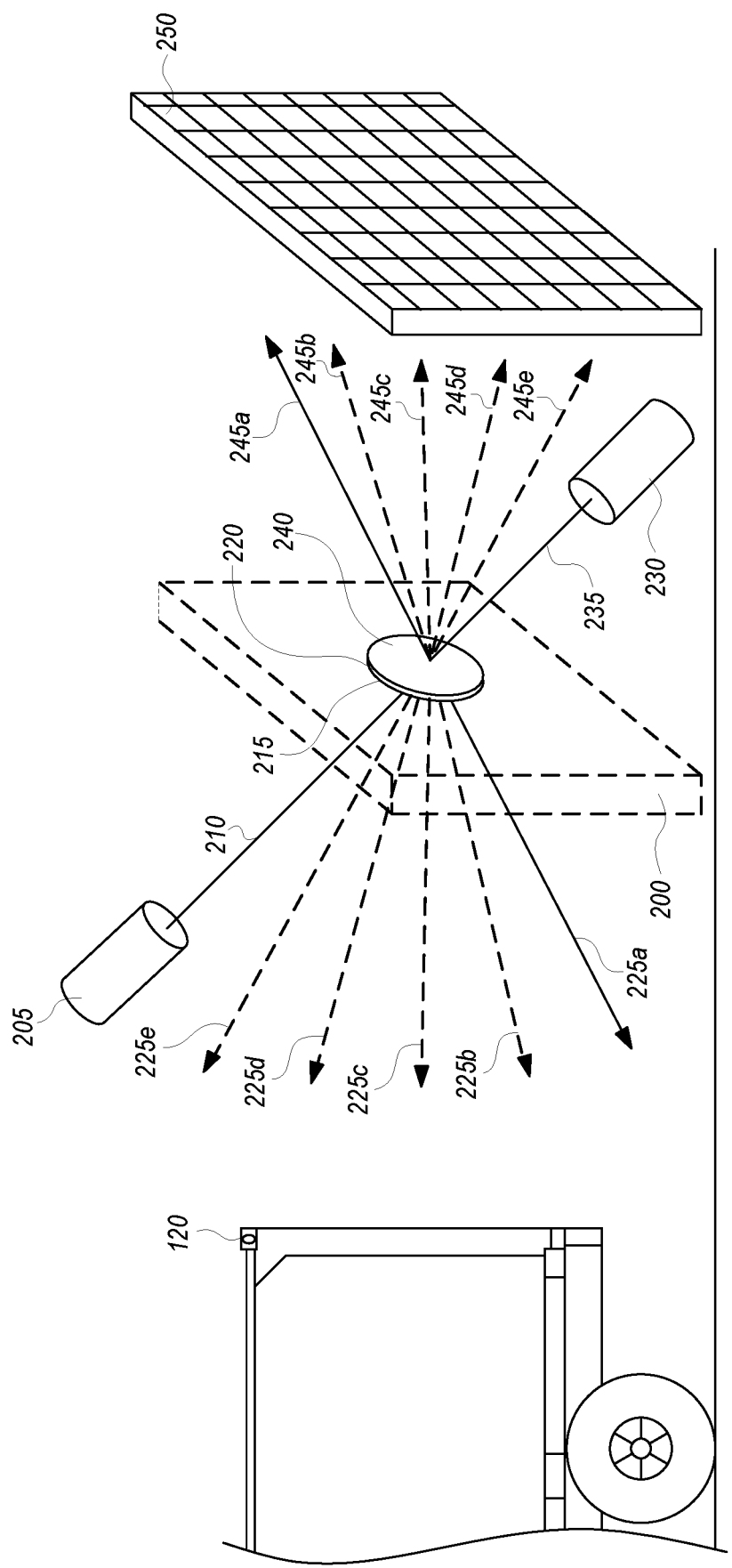
FIG. 2 depicts a simplified illustrative rendering of a MEMS package including a dual sided mirror that can be used in the LiDAR system shown in FIG. 1, according to certain embodiments of the invention.

FIG. 2 depicts a simplified illustrative rendering of a MEMS package 200 that can be used in LiDAR-based system 100 (see FIG. 1). As shown in FIG. 2, MEMS package 200 can be used to form a portion of a LiDAR source, such as source 110 illustrated in FIG. 1. A LiDAR beam generator 205 directs an emitted LiDAR beam 210 on to a first side 215 of a dual sided mirror 220. Emitted LiDAR beam 210 is reflected off dual sided mirror 220 such that as the dual sided mirror is moved, the mirror "steers" the reflected LiDAR beam (225a . . . 225e). Thus, by changing orientation of dual sided mirror 220, reflected LiDAR beam (225a . . . 225e) can be steered in a scanning pattern to detect objects, such as vehicle 120.

Simultaneously, as emitted LiDAR beam 210 is being steered by dual sided mirror 220, a sensing beam generator 230 directs an emitted sensing beam 235 on to a second surface 240 of dual sided mirror 220. As dual sided mirror 220 moves, a reflected sensing beam (245a . . . 245e) is steered in direct relationship with reflected LiDAR beam (225a . . . 225e) and is directed on to a detector array 250. Detector array 250 senses a position of reflected sensing beam (245a . . . 245e) on the detector array and transmits corresponding data to a processor, described in more detail below, that uses the data to determine an orientation of dual sided mirror 220 and the related direction of reflected LiDAR beam (225a . . . 225e). More specifically, as dual sided mirror 220 moves, reflected sensing beam (245a . . . 245e) moves in direct relationship with reflected LiDAR beam (225a . . . 225e) such that data from detector array may be used to determine a direction of reflected LiDAR beam. That is, reflected LiDAR beam 225a corresponds to a position of reflected sensing beam 245a on detector array 250, a direction of reflected LiDAR beam 225b corresponds to a position of reflected sensing beam 245b on the detector array, a direction of reflected LiDAR beam 225c corresponds to a position of reflected sensing beam 245c on the detector array, etc.

Figure 3:
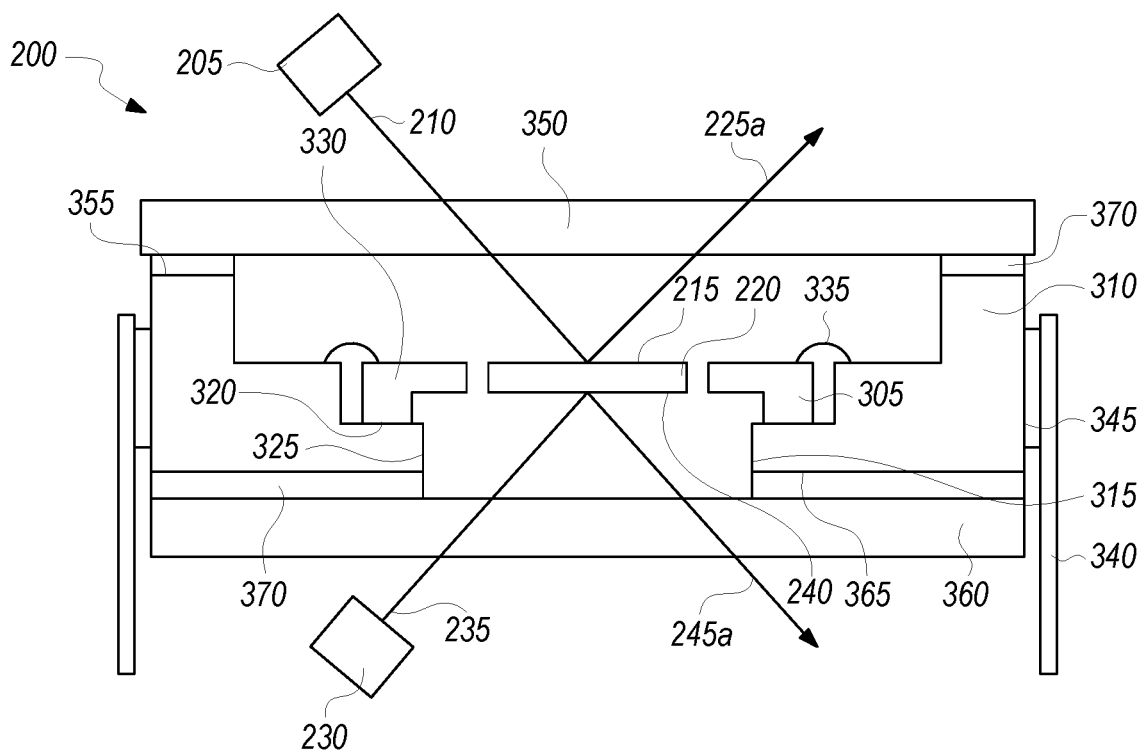
FIG. 3 illustrates a simplified cross-sectional view of the MEMS package shown in FIG. 2, according to certain embodiments of the invention.

FIG. 3 illustrates a simplified cross-sectional view of MEMS package 200 shown in FIG. 2. As shown in FIG. 3, MEMS package 200 includes dual sided mirror 220 that has first surface 215 opposite and spaced apart from second surface 240. As described above, first surface 215 reflects emitted LiDAR beam 210, and second surface 240 reflects emitted sensing beam 235. Dual sided mirror 220 is a portion of a MEMS device 305 that enables dual sided mirror 220 to be moved within MEMS package 200 when electrical signals are applied to the MEMS device. Dual sided mirror 220 is shown in FIG. 3 in a neutral position, however when electrical signals are supplied to MEMS device 305 the dual sided mirror can rotate about one or more axes. In some embodiments dual sided mirror 220 can be rotated about a first axis and a second axis wherein the first axis is orthogonal to the second axis.

In some embodiments MEMS device 305 can be constructed from a base of silicon, one or more layers of an oxide, such as for example silicon-oxide and a top layer of silicon. The top layer of silicon can be implanted with one or more materials and can include metallic conductors and other structures, such as for example comb drive structures, formed thereon. The mirrored surfaces at first and second surfaces 215, 240 can be formed by depositing one or more reflective materials on MEMS device 305.

MEMS device 305 is positioned within MEMS package 200 by a substrate 310 that forms both a structural portion of MEMS package 200 as well as an electrical routing structure, as described in more detail herein. In some embodiments, substrate 310 can be formed from a low temperature co-fired ceramic (LTCC) material in which one or more layers of "green" ceramic are cut, drilled, printed on with conductive ink, and co-fired to form a multilayer ceramic substrate having internal and external electrical conductors that may include conductive vias and other features.

As shown in the embodiment illustrated in FIG. 3, substrate 310 includes an aperture 315 that is formed through a thickness of the substrate so that emitted sensing beam 235 can access second surface 240 of dual sided mirror 220. Substrate 310 also includes a ledge 320 formed around and within a perimeter 325 of aperture 315. MEMS device 305 includes a peripheral portion 330 that is attached to ledge 320 with an epoxy, a solder or other conventional attachment materials. Peripheral portion 330 of MEMS device 305 supports and controls an orientation of dual sided mirror 220, as described in more detail below. MEMS device 305 is electrically coupled to substrate 310 with one or more wirebonds 335. Substrate 310 is electrically coupled to one or more leads 340 that are attached to an exterior 345 of MEMS package 200 and can be used to electrically and mechanically couple the MEMS package to an exterior circuit board or other device.

MEMS package 200 also includes a first transparent window 350 coupled to first surface 355 of substrate 310 and a second transparent window 360 coupled to a second surface 365 of the substrate. First transparent window 350 is positioned adjacent to and aligned with first surface 215 of dual sided mirror 220 such that emitted LiDAR beam 210 can pass through the first transparent window and be reflected off first reflective surface 215. As dual sided mirror 220 is moved, reflected LiDAR beam 225a is steered and passes back through the first transparent window. Similarly, second transparent window 360 is positioned adjacent to and aligned with second surface 240 of dual sided mirror 220 such that emitted sensing beam 235 can pass through the second transparent window and be reflected off second reflective surface 240. As dual sided mirror 220 is moved, reflected sensing beam 245a is steered and passes back through the second transparent window to be received by detection array 250 (see FIG. 2).

In some embodiments first and second transparent windows 350, 360, respectively, are brazed to substrate 310 using one or more braze metals 370. In one embodiment one or more braze metals 370 may be a combination of gold and tin, however in other embodiments it may be a combination of gold and silicon, tin silver and copper or any other combination of materials. In further embodiments, MEMS package 200 can be hermetically sealed such that aperture 315 is a vacuum, or is filled with nitrogen, argon or any other gas. In further embodiments first and/or second transparent windows 350, 360, respectively, can include an anti-reflective coating to minimize light that is reflected off a surface of each window.

First and second transparent windows 350, 360, respectively, can be made from a transparent material such as, but not limited to, fused silica, quartz, sapphire, zinc selenide, calcium fluoride, magnesium fluoride, sodium chloride, potassium bromide or any other suitable material that is transparent to a wavelength of emitted LiDAR beam 210 and/or emitted sensing beam 235.

Substrate 310 is not limited to the specific geometry described above. A person of skill in the art will appreciate that, in other embodiments, any other suitable material can be used for substrate 310 including any ceramic, organic (such as polyamide printed circuit boards), insulated metallic or combination thereof. In some embodiments a metallic frame can be used in place of substrate 310 and one or more electrical feedthroughs can pass through the frame, be electrically insulated from the frame, and used to conduct electrical signals to MEMS device 305. Other package configurations known to those of skill in the art can be substituted.

MEMS package 200 is not limited to using wirebonds 335 to couple MEMS device 305 to substrate 310. A person of skill in the art will appreciate that, in other embodiments, any other suitable interconnect can be used including but not limited to solder balls, solder pads, pins or columns.

As used herein a LiDAR system shall be defined as a surveying and detection apparatus that emits pulsed light from a source and measures reflected pulses with a detection system. The pulsed light source can have any bandwidth or combination of bandwidths of light frequencies and in some embodiments can use ultraviolet, visible and/or near infrared light. As used herein, transparent shall mean a material that allows a substantial portion of the wavelengths emitted by a particular light source to pass through. Similarly, as used herein, the terms mirror and reflective surface shall be synonymous and shall mean a surface that reflects a substantial portion of the wavelengths emitted by a particular light source.

Figure 4:
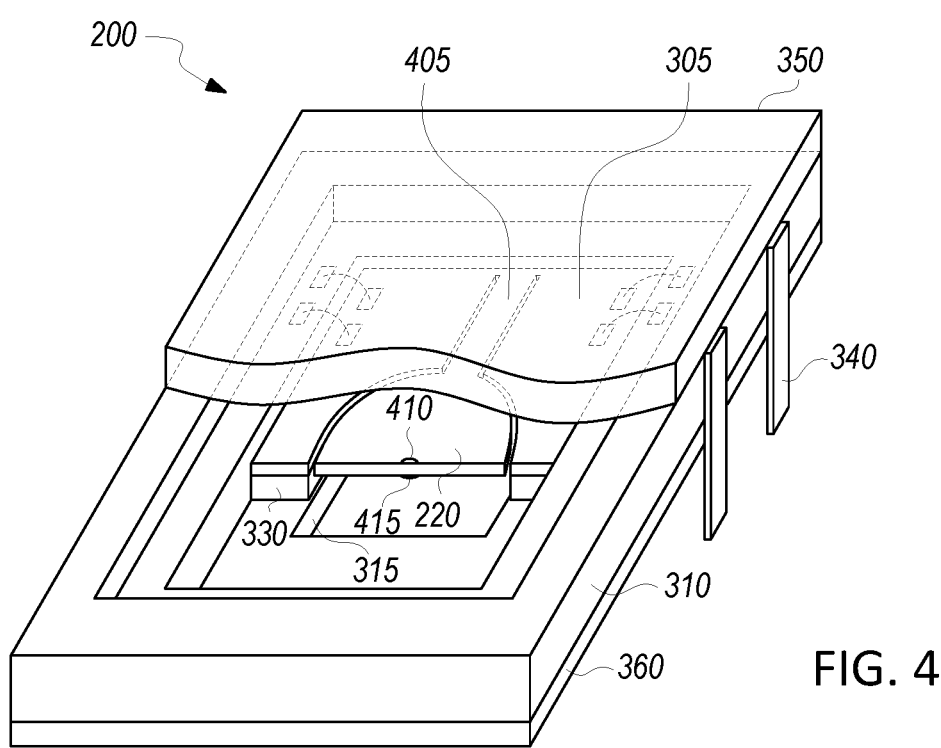
FIG. 4 illustrates a simplified isometric view of MEMS package shown in FIGS. 2 and 3, according to certain embodiments of the invention.

FIG. 4 illustrates a simplified isometric view of MEMS package 200 shown in FIGS. 2 and 3. As shown in FIG. 4, portions of first transparent window 350 and MEMS device 305 have been cut away for clarity. As described above, MEMS device 305 can include a peripheral portion 330 that supports dual sided mirror 220 over aperture 315. Dual sided mirror 220 can be coupled to peripheral portion 330 with one or more flexible beams 405. Flexible beams 405 can include a comb drive or other structure (not shown) that enables dual sided mirror 220 to be moved. Dual sided mirror 220 can be positioned over aperture 315 allowing for the dual sided mirror to be tilted along at least two orthogonal axes without making contact with substrate 310.

In some embodiments, to correlate reflected sense beam 245a (see FIGS. 2 and 3) with reflected LiDAR beam 225a, emitted sense beam 235 may be focused on a similar location on dual sided mirror 220 as emitted LiDAR beam 210. More specifically, emitted LiDAR beam 210 (see FIGS. 2 and 3) may be focused on a center portion 410 of first surface 215 and emitted sensing beam 235 may be focused on a central portion 415 of second surface 240, where the center portion is directly opposite the central portion such that when dual sided mirror 220 is moved, reflected sense beam 245a responds substantially similar to reflected LiDAR beam 225a.

Figure 5:
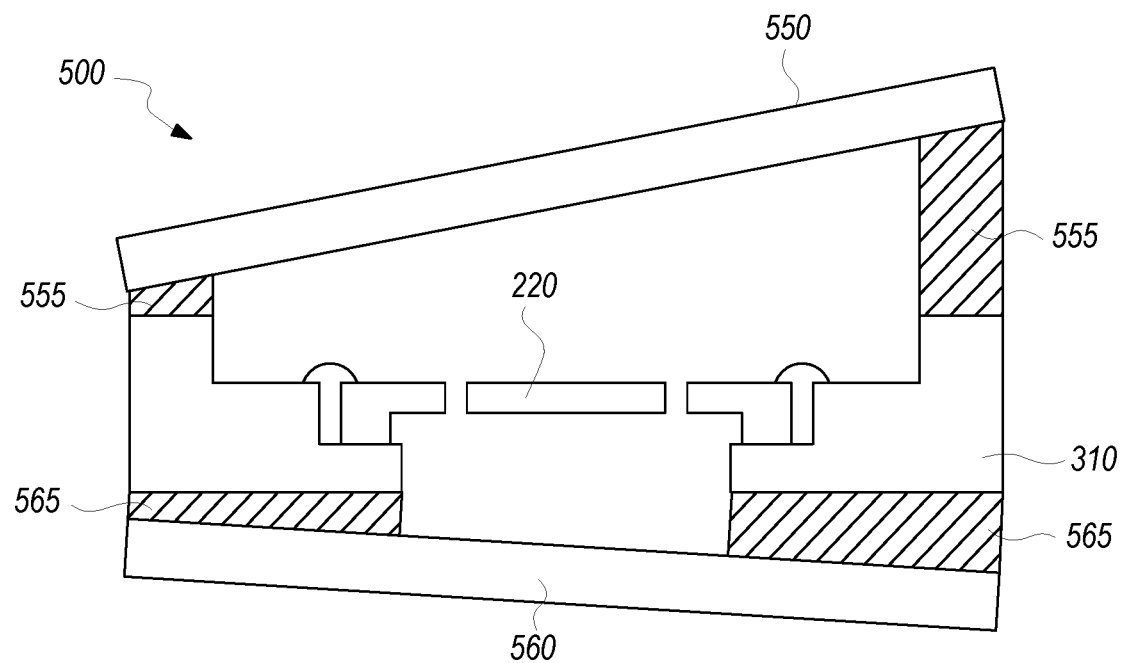
FIG. 5 illustrates a simplified cross-sectional view of a MEMS package that includes one or more tilted transparent outer layers, according to certain embodiments of the invention.

FIG. 5 illustrates a simplified cross-sectional view of a MEMS package 500 that is similar to MEMS package 200 illustrated in FIGS. 2-4, however in this embodiment MEMS package 500 has tilted first and second windows 550, 560, respectively, in accordance with embodiments of the invention. As shown in FIG. 5, in some embodiments tilted first and second windows 550, 560, respectively, can assist with mitigating the effects of stray reflection from an emitted LiDAR beam and/or an emitted sense beam by being tilted at an angle relative to a neutral position of dual sided mirror 220.

In some embodiments an upper seal ring 555 can be positioned between substrate 310 and first window 550 such that the first window sits at an angle relative to a neutral position of dual sided mirror 220. More specifically, in some embodiments upper seal ring 555 can have a non-uniform cross-section such that causes first window 550 to be positioned at an angle (e.g., non-parallel) with respect to dual sided mirror 220. Similarly, a lower seal ring 565 can be positioned between substrate 310 and second window 560 to cause the second window to be tilted relative to a neutral position of dual sided mirror 220. Any type of solder, braze or other material can be used to attach upper and lower seal rings, 555, 565, respectively, to substrate 310 and to first and second windows 550, 560, respectively. In further embodiments substrate 310 can be manufactured to have a non-uniform cross-section such that first and second windows 550, 560, respectively, are positioned at an angle relative to a neutral position of dual sided mirror 220.

Figure 6:
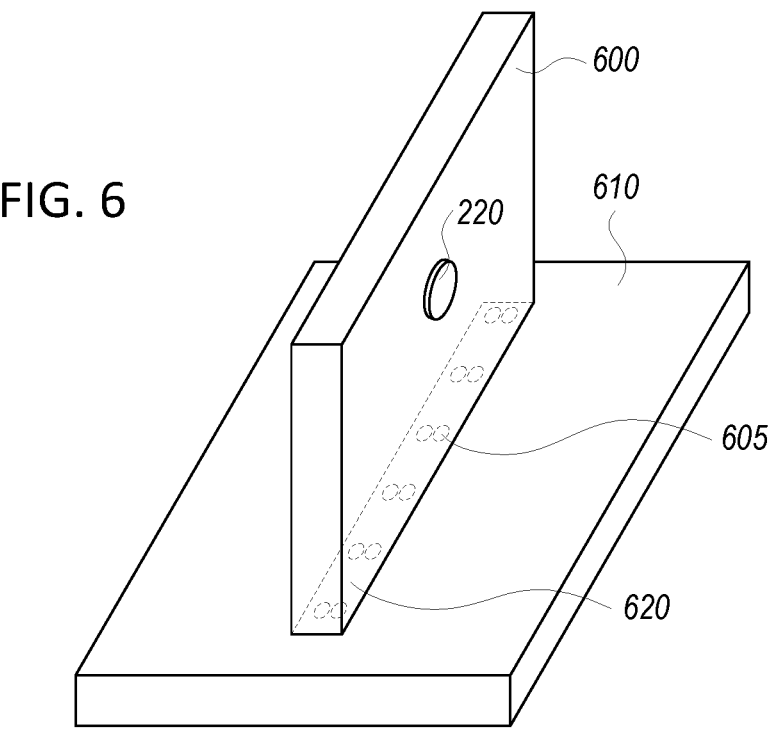
FIG. 6 illustrates a simplified isometric view of a MEMS package that is mounted on its edge, according to certain embodiments of the invention.

FIG. 6 illustrates a simplified isometric view of a MEMS package 600 that is similar to MEMS package 200 illustrated in FIGS. 2-4, however MEMS package 600 employs an array of bond pads 605 to couple the MEMS package to an external circuit board 610, rather than leads 340 as shown in FIGS. 3 and 4. As shown in FIG. 6, MEMS package 600 is oriented perpendicular to external circuit board 610 which may enable improved access to both sides of the MEMS package as compared to a MEMS package that is oriented parallel to an external circuit board. More specifically, because some embodiments disclosed herein include light beams that access both sides of the MEMS package, the mounting configuration illustrated in FIG. 6 may enable access to both sides of dual sided mirror 220 without forming apertures in external circuit board 610.

As shown in FIG. 6, MEMS package 600 includes a plurality of bond pads 605 positioned along an outer surface 620. In some embodiments bond pads 605 can be metallic regions formed on an exterior surface of substrate 310 (see FIGS. 3 and 4). Bond pads 605 can be coupled to external circuit board 610 by applying solder paste to regions of the external circuit board, placing MEMS package 600 on the solder paste and reflowing the assembly in a heated atmosphere. The attachment of MEMS package 600 to external circuit board 610 in a perpendicular configuration is not limited to the specific geometry depicted in FIG. 6. A person of skill in the art will appreciate that, in other embodiments can employ an array of pins, columns or solder balls or myriad other configurations.

The MEMS package configurations described above in FIGS. 1-6 are not limited for use with LiDAR-based systems. A person of skill in the art will appreciate that a MEMS package including a dual sided mirror may be useful in any application that uses a mirror to steer light such as, but not limited to, a LiDAR receiver, the head light of a vehicle that turns in coordination with the vehicular steering system, optical diagnostic equipment such as an endoscope, and other applications. A person of skill in the art will further appreciate that a mirror can be fabricated in any shape including round, square, rectangular, triangular, octagonal or any other geometry.

Example LiDAR System Implementing Aspects of Embodiments Herein

Figure 7:
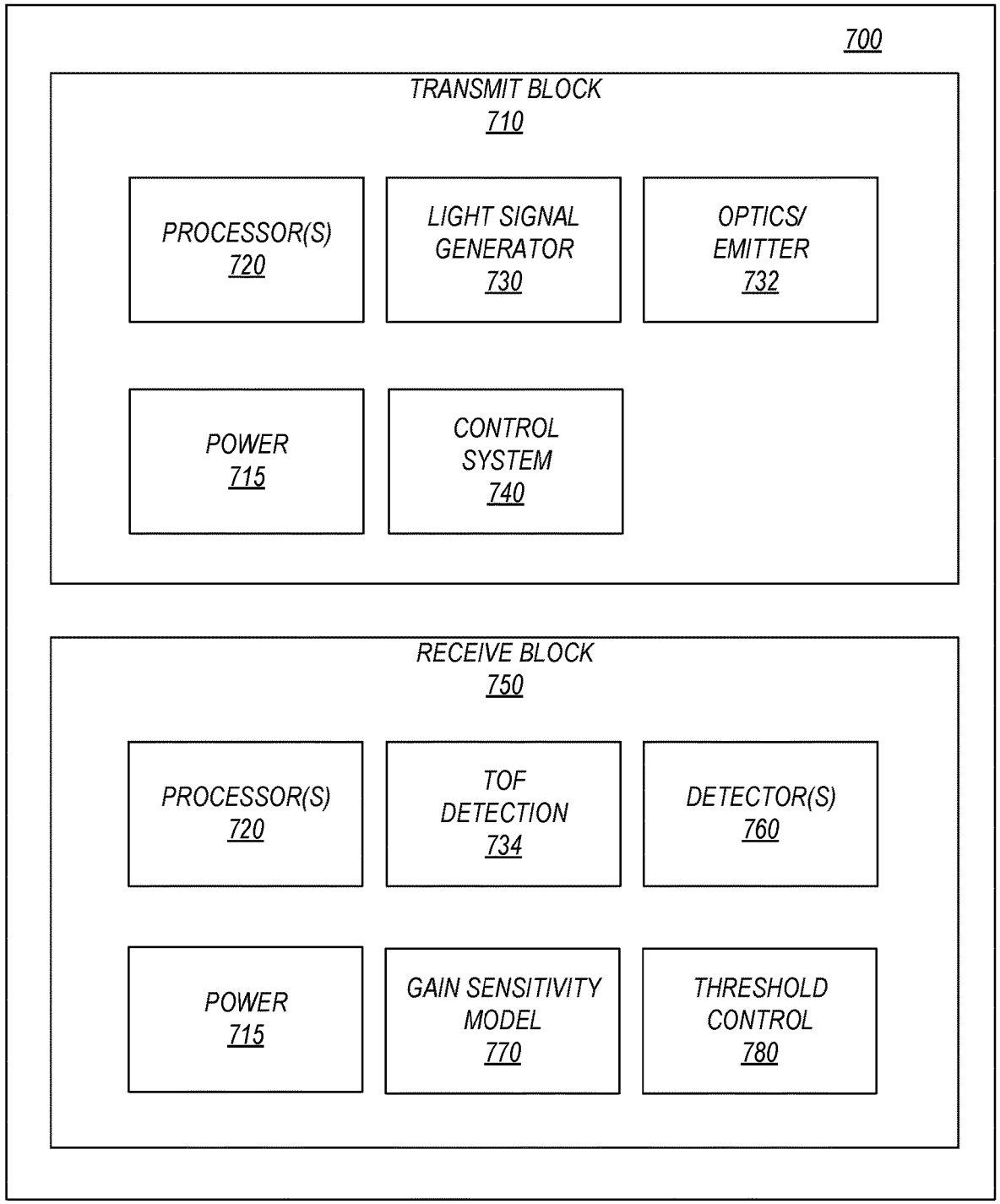
FIG. 7 illustrates a simplified block diagram showing aspects of a LiDAR-based detection system 700, according to certain embodiments of the invention.

FIG. 7 illustrates a simplified block diagram showing aspects of a LiDAR-based detection system 700, according to certain embodiments. System 700 may be configured to transmit, detect, and process LiDAR signals to perform object detection as described above with regard to LiDAR system 100 described in FIG. 1. In general, a LiDAR system 700 includes one or more transmitters (e.g., transmit block 710) and one or more receivers (e.g., receive block 750). LiDAR system 700 may further include additional systems that are not shown or described to prevent obfuscation of the novel features described herein.

Transmit block 710, as described above, can incorporate a number of systems that facilitate that generation and emission of a light signal, including dispersion patterns (e.g., 360 degree planar detection), pulse shaping and frequency control, TOF measurements, and any other control systems to enable the LiDAR system to emit pulses in the manner described above. In the simplified representation of FIG. 7, transmit block 710 can include processor(s) 720, light signal generator 730, optics/emitter module 732, power block 715 and control system 740. Some of all of system blocks 720-740 can be in electrical communication with processor(s) 720.

In certain embodiments, processor(s) 720 may include one or more microprocessors (μCs) and can be configured to control the operation of system 700. Alternatively or additionally, processor 720 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, μCs, DSPs, ASIC, programmable logic device, and the like, may be configured in other system blocks of system 700. For example, control system block 740 may include a local processor to certain control parameters (e.g., operation of the emitter). Processor(s) 720 may control some or all aspects of transmit block 710 (e.g., optics/emitter 732, control system 740, dual sided mirror 220 position, detection array 250, etc.), receive block 750 (e.g., processor(s) 720) or any aspects of LiDAR system 700. In some embodiments, multiple processors may enable increased performance characteristics in system 700 (e.g., speed and bandwidth), however multiple processors are not required, nor necessarily germane to the novelty of the embodiments described herein. Alternatively or additionally, certain aspects of processing can be performed by analog electronic design, as would be understood by one of ordinary skill in the art.

Light signal generator 730 may include circuitry (e.g., a laser diode) configured to generate a light signal, which can be used as the LiDAR send signal, according to certain embodiments. In some cases, light signal generator 730 may generate a laser that is used to generate a continuous or pulsed laser beam at any suitable electromagnetic wavelengths spanning the visible light spectrum and non-visible light spectrum (e.g., ultraviolet and infra-red). In some embodiments, lasers are commonly in the range of 600-1200 nm, although other wavelengths are possible, as would be appreciated by one of ordinary skill in the art.

Optics/Emitter block 732 (also referred to as transmitter 732) may include one or more arrays of mirrors (including but not limited to dual sided mirror 220 as described above in FIGS. 1-6) for redirecting and/or aiming the emitted laser pulse, mechanical structures to control spinning and/or moving of the emitter system, or other system to affect the system field-of-view, as would be appreciated by one of ordinary skill in the art with the benefit of this disclosure. For instance, some systems may incorporate a beam expander (e.g., convex lens system) in the emitter block that can help reduce beam divergence and increase the beam diameter. These improved performance characteristics may mitigate background return scatter that may add noise to the return signal. In some cases, optics/emitter block 732 may include a beam splitter to divert and sample a portion of the pulsed signal. For instance, the sampled signal may be used to initiate the TOF clock. In some cases, the sample can be used as a reference to compare with backscatter signals. Some embodiments may employ micro electromechanical mirrors (MEMS) that can reorient light to a target field. Alternatively or additionally, multi-phased arrays of lasers may be used. Any suitable system may be used to emit the LiDAR send pulses, as would be appreciated by one of ordinary skill in the art.

Power block 715 can be configured to generate power for transmit block 710, receive block 750, as well as manage power distribution, charging, power efficiency, and the like. In some embodiments, power management block 715 can include a battery (not shown), and a power grid within system 700 to provide power to each subsystem (e.g., control system 740, etc.). The functions provided by power management block 715 may be subsumed by other elements within transmit block 710, or may provide power to any system in LiDAR system 700. Alternatively, some embodiments may not include a dedicated power block and power may be supplied by a number of individual sources that may be independent of one another.

Control system 740 may control aspects of light signal generation (e.g., pulse shaping), optics/emitter control, TOF timing, or any other function described herein. In some cases, aspects of control system 740 may be subsumed by processor(s) 720, light signal generator 730, or any block within transmit block 710, or LiDAR system 700 in general.

Receive block 750 may include circuitry configured to detect a process a return light pulse to determine a distance of an object, and in some cases determine the dimensions of the object, the velocity and/or acceleration of the object, and the like. Processor(s) 765 may be configured to perform operations such as processing received return pulses from detectors(s) 760, controlling the operation of TOF module 734, controlling threshold control module 780, or any other aspect of the functions of receive block 750 or LiDAR system 700 in general.

TOF module 734 may include a counter for measuring the time-of-flight of a round trip for a send and return signal. In some cases, TOF module 734 may be subsumed by other modules in LiDAR system 700, such as control system 740, optics/emitter 732, or other entity. TOF modules 734 may implement return "windows" that limit a time that LiDAR system 700 looks for a particular pulse to be returned. For example, a return window may be limited to a maximum amount of time it would take a pulse to return from a maximum range location (e.g., 250 m). Some embodiments may incorporate a buffer time (e.g., maximum time plus 10%). TOF module 734 may operate independently or may be controlled by other system block, such as processor(s) 720, as described above. In some embodiments, transmit block may also include a TOF detection module. One of ordinary skill in the art with the benefit of this disclosure would appreciate the many modification, variations, and alternative ways of implementing the TOF detection block in system 700.

Detector(s) 760 may detect incoming return signals that have reflected off of one or more objects. In some cases, LiDAR system 700 may employ spectral filtering based on wavelength, polarization, and/or range to help reduce interference, filter unwanted frequencies, or other deleterious signals that may be detected. Typically, detector(s) 760 can detect an intensity of light and records data about the return signal (e.g., via coherent detection, photon counting, analog signal detection, or the like). Detector (s) 760 can use any suitable photodetector technology including solid state photodetectors (e.g., silicon avalanche photodiodes, complimentary metal-oxide semiconductors (CMOS), charge-coupled devices (CCD), hybrid CMOS/CCD devices) or photomultipliers. In some cases, a single receiver may be used or multiple receivers may be configured to operate in parallel.

Gain sensitivity model 770 may include systems and/or algorithms for determining a gain sensitivity profile that can be adapted to a particular object detection threshold. The gain sensitivity profile can be modified based on a distance (range value) of a detected object (e.g., based on TOF measurements). In some cases, the gain profile may cause an object detection threshold to change at a rate that is inversely proportional with respect to a magnitude of the object range value. A gain sensitivity profile may be generated by hardware/software/firmware, or gain sensor model 770 may employ one or more look up tables (e.g., stored in a local or remote database) that can associate a gain value with a particular detected distance or associate an appropriate mathematical relationship there between (e.g., apply a particular gain at a detected object distance that is 10% of a maximum range of the LiDAR system, apply a different gain at 15% of the maximum range, etc.). In some cases, a Lambertian model may be used to apply a gain sensitivity profile to an object detection threshold, as shown and described below with respect to FIG. 4. The Lambertian model typically represents perfectly diffuse (matte) surfaces by a constant bidirectional reflectance distribution function (BRDF), which provides reliable results in LiDAR system as described herein. However, any suitable gain sensitivity profile can be used including, but not limited to, Oren-Nayar model, Nanrahan-Krueger, Cook-Torrence, Diffuse BRDF, Limmel-Seeliger, Blinn-Phong, Ward model, HTSG model, Fitted Lafortune Model, or the like. One of ordinary skill in the art with the benefit of this disclosure would understand the many alternatives, modifications, and applications thereof.

Threshold control block 780 may set an object detection threshold for LiDAR system 700. For example, threshold control block 780 may set an object detection threshold over a certain a full range of detection for LiDAR system 700. The object detection threshold may be determined based on a number of factors including, but not limited to, noise data (e.g., detected by one or more microphones) corresponding to an ambient noise level, and false positive data (typically a constant value) corresponding to a rate of false positive object detection occurrences for the LiDAR system. In some embodiments, the object detection threshold may be applied to the maximum range (furthest detectable distance) with the object detection threshold for distances ranging from the minimum detection range up to the maximum range being modified by a gain sensitivity model (e.g., Lambertian model).

Although certain systems may not expressly discussed, they should be considered as part of system 700, as would be understood by one of ordinary skill in the art. For example, system 700 may include a bus system (e.g., CAMBUS) to transfer power and/or data to and from the different systems therein. In some embodiments, system 700 may include a storage subsystem (not shown). A storage subsystem can store one or more software programs to be executed by processors (e.g., in processor(s) 720). It should be understood that "software" can refer to sequences of instructions that, when executed by processing unit(s) (e.g., processors, processing devices, etc.), cause system 700 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein. Some software controlled aspects of LiDAR system 700 may include aspects of gain sensitivity model 770, threshold control 780, control system 740, TOF module 734, or any other aspect of LiDAR system 700.

It should be appreciated that system 700 is meant to be illustrative and that many variations and modifications are possible, as would be appreciated by one of ordinary skill in the art. System 700 can include other functions or capabilities that are not specifically described here. For example, LiDAR system 700 may include a communications block (not shown) configured to enable communication between LiDAR system 700 and other systems of the vehicle or remote resource (e.g., remote servers), etc., according to certain embodiments. In such cases, the communications block can be configured to provide wireless connectivity in any suitable communication protocol (e.g., radio-frequency (RF), Bluetooth, BLE, infra-red (IR), ZigBee, Z-Wave, Wi-Fi, or a combination thereof).

While system 700 is described with reference to particular blocks (e.g., threshold control block 780), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 700 may be combined with or operated by other sub-systems as informed by design. For example, power management block 715 and/or threshold control block 780 may be integrated with processor(s) 720 instead of functioning as separate entities.

Example Computer Systems Implementing Aspects of Embodiments Herein

Figure 8:
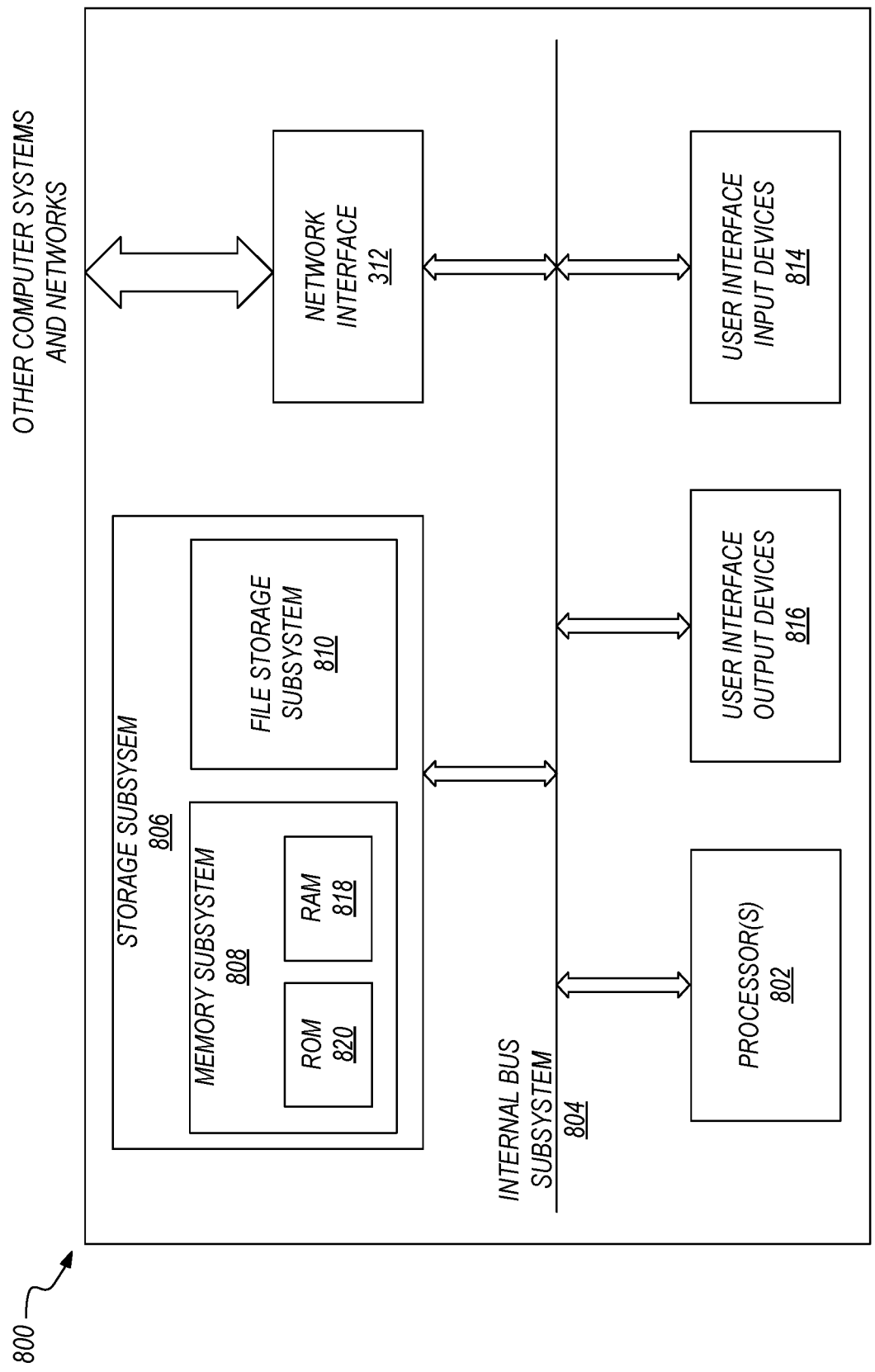
FIG. 8 illustrates an example computer system that may be utilized to implement techniques disclosed herein, according to certain embodiments of the invention.

FIG. 8 is a simplified block diagram of computer system 800 configured to operate aspects of a LiDAR-based detection system, according to certain embodiments. Computer system 800 can be used to implement any of the systems and modules discussed above with respect to FIGS. 1-7. For example, computer system 800 may operate aspects of threshold control 780, TOF module 734, processor(s) 720, control system 740, or any other element of LiDAR system 700 or other system described herein. Computer system 800 can include one or more processors 802 that can communicate with a number of peripheral devices (e.g., input devices) via a bus subsystem 804. These peripheral devices can include storage subsystem 806 (comprising memory subsystem 808 and file storage subsystem 810), user interface input devices 814, user interface output devices 816, and a network interface subsystem 812.

In some examples, internal bus subsystem 804 (e.g., CAMBUS) can provide a mechanism for letting the various components and subsystems of computer system 800 communicate with each other as intended. Although internal bus subsystem 804 is shown schematically as a single bus, alternative embodiments of the bus subsystem can utilize multiple buses. Additionally, network interface subsystem 812 can serve as an interface for communicating data between computer system 800 and other computer systems or networks. Embodiments of network interface subsystem 812 can include wired interfaces (e.g., Ethernet, CAN, RS232, RS485, etc.) or wireless interfaces (e.g., ZigBee, Wi-Fi, cellular, etc.).

In some cases, user interface input devices 814 can include a keyboard, pointing devices (e.g., mouse, trackball, touchpad, etc.), a barcode scanner, a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 800. Additionally, user interface output devices 816 can include a display subsystem, a printer, or non-visual displays such as audio output devices, etc. The display subsystem can be any known type of display device. In general, use of the term "output device" is intended to include all possible types of devices and mechanisms for outputting information from computer system 800.

Storage subsystem 806 can include memory subsystem 808 and file/disk storage subsystem 810. Subsystems 808 and 810 represent non-transitory computer-readable storage media that can store program code and/or data that provide the functionality of embodiments of the present disclosure. In some embodiments, memory subsystem 808 can include a number of memories including main random access memory (RAM) 818 for storage of instructions and data during program execution and read-only memory (ROM) 820 in which fixed instructions may be stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and not intended to limit embodiments of the present disclosure. Many other configurations having more or fewer components than system 800 are possible.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local-area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C # or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:
1. A micro-electromechanical system (MEMS) package comprising:
 a manipulable mirror having a first reflective surface and a second reflective surface, the first reflective surface and the second reflective surface positioned on opposite sides of a monolithic structure;

a first transparent window positioned adjacent to and aligned with the first reflective surface, the first reflective surface configured to receive and reflect a LIDAR light beam;

a second transparent window positioned adjacent to and aligned with the second reflective surface; and a detector configured to receive a sensing beam reflected off of the second reflective surface and determine an orientation of the manipulable mirror and related direction of the LIDAR light beam based on the sensing beam.

2. The MEMS package of claim 1 wherein the mirror is a portion of a MEMS device.

3. The MEMS package of claim 2 further comprising a substrate extending between and attached to the first and second transparent windows, the substrate further electrically and mechanically coupled to the MEMS device.

4. The MEMS package of claim 3 wherein the substrate includes an aperture aligned with and positioned over the second reflective surface.

5. The MEMS package of claim 3 wherein a hermetic seal is formed between the substrate and the first and second transparent windows.

6. The MEMS package of claim 1 wherein the first transparent window is positioned to allow the LiDAR light beam to pass through and be reflected off the first reflective surface.

7. The MEMS package of claim 1 wherein the second transparent window is positioned to allow the sensing beam to pass through and be reflected off the second reflective surface.

8. The MEMS package of claim 1 wherein the first transparent window is not parallel with the second transparent window.

9. A method of using a micro-electromechanical system (MEMS) package comprising:

receiving a first light beam through a first window of the MEMS package;

steering a reflection of the first light beam through the first window by reflecting the first light beam off a first surface of a mirror;

receiving a second light beam through a second window of the MEMS package;

steering a reflection of the second light beam through the second window by reflecting the second light beam off a second surface of the mirror, wherein the first surface and the second surface of the mirror are opposite sides of a monolithic structure of the mirror, and determining an orientation of the mirror by detecting the reflection of the second light beam.

10. The method of claim 9 wherein the orientation of the mirror is used to determine a direction of the reflection of the first light beam.

11. The method of claim 9 further comprising a detector array positioned outside of the MEMS package and configured to detect the reflection of the second light beam.

12. The method of claim 9 wherein the mirror pivots about a first axis and a second axis wherein the first axis is orthogonal to the second axis.

13. The method of claim 12 wherein the mirror pivots in response to an application of one or more electrical signals to a MEMS device that includes the mirror.

14. The method of claim 9 wherein the MEMS package includes a substrate defining an aperture and wherein the second surface of the mirror is aligned with and positioned over the aperture.

* * * * *